United States Patent
Yerneni et al.

(10) Patent No.: US 7,958,088 B2
(45) Date of Patent: Jun. 7, 2011

(54) DYNAMIC DATA REORGANIZATION TO ACCOMMODATE GROWTH ACROSS REPLICATED DATABASES

(75) Inventors: Ramana V. Yerneni, Cupertino, CA (US); Michael Bigby, San Jose, CA (US); Philip Bohannon, Cupertino, CA (US); Bryan Call, San Jose, CA (US); Brian Cooper, San Jose, CA (US); Andrew Feng, Cupertino, CA (US); David Lomax, San Jose, CA (US); Raghu Ramakrishnan, Santa Clara, CA (US); Utkarsh Srivastava, Fremont, CA (US); Daniel Weaver, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 753 days.

(21) Appl. No.: 11/957,132

(22) Filed: Dec. 14, 2007

(65) Prior Publication Data

US 2009/0157762 A1 Jun. 18, 2009

(51) Int. Cl.
*G06F 7/00* (2006.01)

(52) U.S. Cl. .................................................. 707/610
(58) Field of Classification Search .............. 707/610, 707/615–618, 626, 633–639, 737, 755
See application file for complete search history.

(56) References Cited

U.S. PATENT DOCUMENTS

| 6,243,715 | B1 | 6/2001 | Bogantz et al. | |
|---|---|---|---|---|
| 2003/0191782 | A1* | 10/2003 | Buxton et al. | 707/202 |
| 2006/0190497 | A1* | 8/2006 | Inturi et al. | 707/201 |
| 2007/0220059 | A1* | 9/2007 | Lu et al. | 707/200 |
| 2009/0089313 | A1* | 4/2009 | Cooper et al. | 707/102 |

* cited by examiner

*Primary Examiner* — Wilson Lee
(74) *Attorney, Agent, or Firm* — Berkeley Law & Technology Group, LLP

(57) ABSTRACT

Methods and apparatuses are provided for dynamically reorganizing the data within a replicated database system. One method, for example, includes performing a split operation across a plurality of replicated databases with regard to an existing partition therein, wherein the existing partition comprises a plurality of data records and the two new partitions each include at least a portion of the plurality of data records, and allowing at least one type of access to the plurality of data records during the split operation.

22 Claims, 3 Drawing Sheets

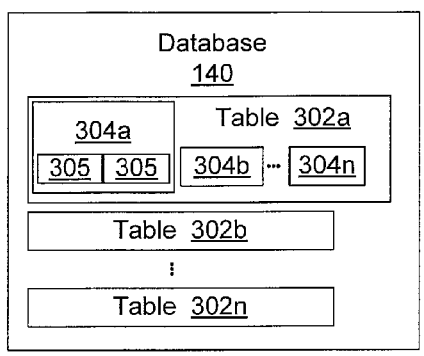
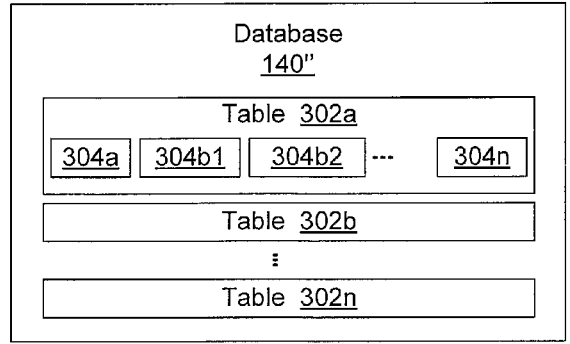
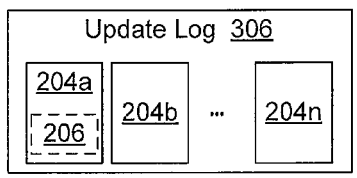
Fig. 3C
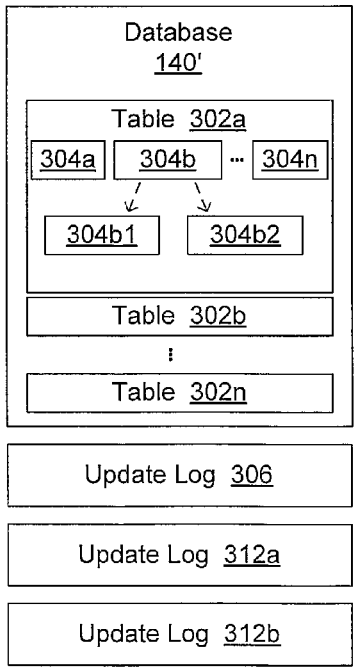
Fig. 3A
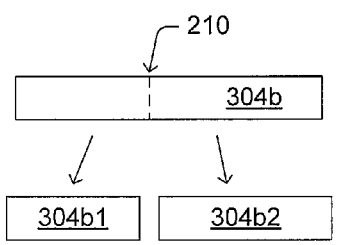
Fig. 4
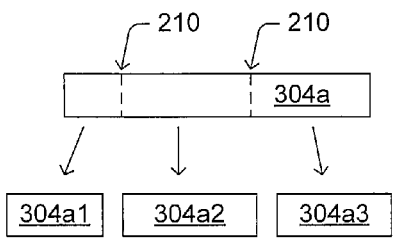
Fig. 5
Fig. 3B

DYNAMIC DATA REORGANIZATION TO ACCOMMODATE GROWTH ACROSS REPLICATED DATABASES

BACKGROUND

1. Field

The subject matter disclosed herein relates to data processing, and more particularly to data processing methods and systems that allow for data within replicated databases to be reorganized.

2. Information

Data processing tools and techniques continue to improve. Information in the form of data is continually being generated or otherwise identified, collected, stored, shared, and analyzed. Databases and other like data repositories are common place, as are related communication networks and computing resources that provide access to such information. To provide adequate and/or robust access to such data, replicated databases are often provided.

BRIEF DESCRIPTION OF DRAWINGS

Non-limiting and non-exhaustive aspects are described with reference to the following figures, wherein like reference numerals refer to like parts throughout the various figures unless otherwise specified.

FIGS. 3A-C are block diagrams illustrating an exemplary embodiment of a replicated database being dynamically reorganized.

FIGS. 4 and 5 are block diagrams illustrating exemplary embodiments of portions of data associated with a replicated database being dynamically reorganized.

DETAILED DESCRIPTION

Techniques are provided herein that may be used to reorganize data, or portions of data, associated with replicated databases. These techniques may be implemented to allow the reorganization of data to occur dynamically without significantly interrupting access (e.g., reading and writing (inserting, deleting, and/or updating)) to the affected data or portions of data during a reorganization process.

In one technique, for example, when a reorganization of a portion of the data associated with a replicated database is desired, a prepare action may be initiated to have all of the replicas of the portion of data being reorganized to reach agreement with respect to the reorganization. Subsequently, a commit action may be initiated and a reorganized version of the portion of data may be established, while the existing version of the portion of data continues to remain accessible and the data updates associated with the portion of data to be collected and stored. The applicable collected data updates may be applied to the reorganized version. The reorganized version may be operatively associated with the replicated database and made accessible. The existing version may be operatively disassociated from the replicated database so that it is no longer accessible.

Figure 1:
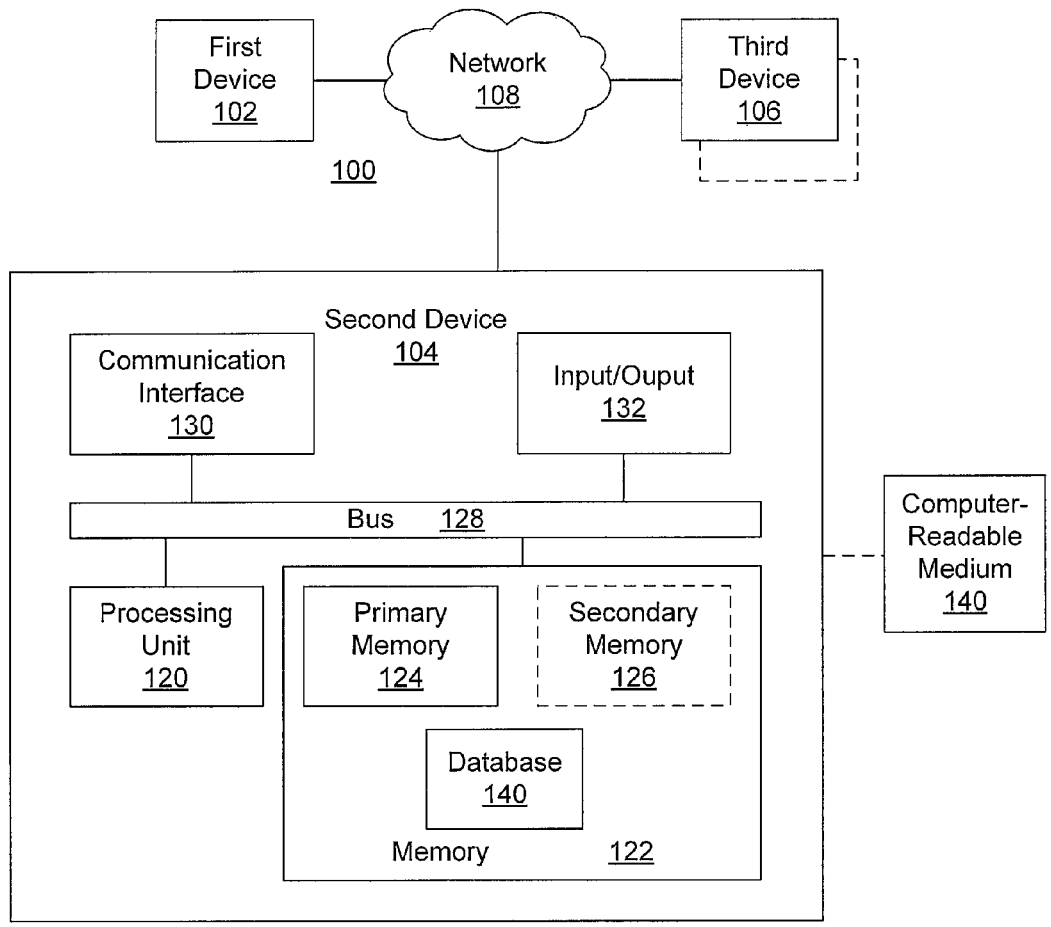
FIG. 1 is a block diagram illustrating an exemplary embodiment of a computing environment system and device with which replicated databases may be dynamically reorganized.

FIG. 1 is a block diagram illustrating an exemplary embodiment of a computing environment system 100 with which replicated databases may be provided and dynamically reorganized.

Computing environment system 100 may include, for example, a first device 102, a second device 104 and a third device 106, which may be operatively coupled together through a network 108.

First device 102, second device 104 and third device 106, as shown in FIG. 1, are each representative of any device, appliance or machine that may be configurable to exchange data over network 108 and host or otherwise provide one or more replicated databases. By way of example but not limitation, any of first device 102, second device 104, or third device 106 may include: one or more computing devices or platforms, such as, e.g., a desktop computer, a laptop computer, a workstation, a server device, storage units, or the like.

Network 108, as shown in FIG. 1, is representative of one or more communication links, processes, and/or resources configurable to support the exchange of data between at least two of first device 102, second device 104 and third device 106. By way of example but not limitation, network 108 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 106, there may be additional like devices operatively coupled to network 108.

It is recognized that all or part of the various devices and networks shown in system 100, and the processes and methods as further described herein, may be implemented using or otherwise include hardware, firmware, software, or any combination thereof.

Thus, by way of example but not limitation, second device 104 may include at least one processing unit 120 that is operatively coupled to a memory 122 through a bus 128.

Processing unit 120 is representative of one or more circuits configurable to perform at least a portion of a data computing procedure or process. By way of example but not limitation, processing unit 120 may include one or more processors, controllers, microprocessors, microcontrollers, application specific integrated circuits, digital signal processors, programmable logic devices, field programmable gate arrays, and the like, or any combination thereof.

Memory 122 is representative of any data storage mechanism. Memory 122 may include, for example, a primary memory 124 and/or a secondary memory 126. Primary memory 124 may include, for example, a random access memory, read only memory, etc. While illustrated in this example as being separate from processing unit 120, it should be understood that all or part of primary memory 124 may be provided within or otherwise co-located/coupled with processing unit 120.

Secondary memory 126 may include, for example, the same or similar type of memory as primary memory and/or one or more data storage devices or systems, such as, for example, a disk drive, an optical disc drive, a tape drive, a solid state memory drive, etc. In certain implementations, secondary memory 126 may be operatively receptive of, or otherwise configurable to couple to, a computer-readable medium 140. Computer-readable medium 140 may include, for example, any medium that can carry and/or make accessible data, code and/or instructions for one or more of the devices in system 100.

Additionally, as illustrated in FIG. 1, memory 122 may include a data associated with a database 140 (e.g., a replicated database). Such data may, for example, be stored in primary memory 124 and/or secondary memory 126. As used herein, such data or portions thereof, may be considered operatively associated with the database when accessible (e.g., allowing the data to read and/or updated), for example, via corresponding database application or other like tools. To the contrary, such data or portions thereof, may be considered operatively disassociated with the database when not accessible (e.g., the data cannot be read and/or updated).

Second device 104 may include, for example, a communication interface 130 that provides for or otherwise supports the operative coupling of second device 104 to at least network 108. By way of example but not limitation, communication interface 130 may include a network interface device or card, a modem, a router, a switch, a transceiver, and the like.

Second device 104 may include, for example, an input/output 132. Input/output 132 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 132 may include an operatively adapted display, speaker, keyboard, mouse, trackball, touch screen, data port, etc.

Figure 2:
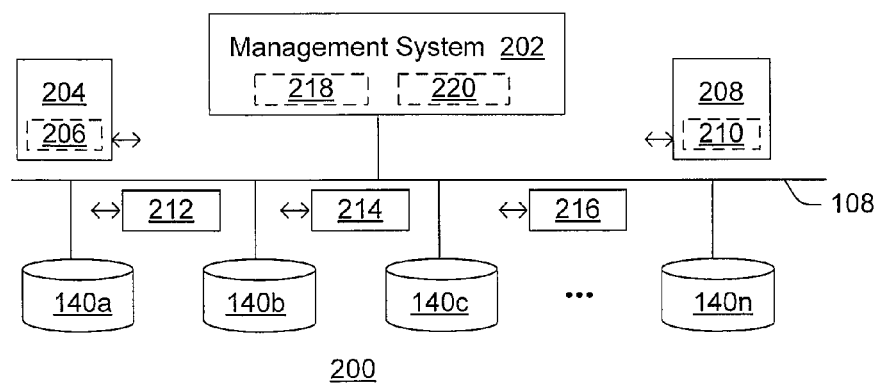
FIG. 2 is a block diagram illustrating an exemplary embodiment of a plurality of replicated databases that may be dynamically reorganized.

FIG. 2 is block diagram illustrating an exemplary embodiment of an arrangement 200 that may be implemented, for example, using system 100 or the like, and which includes a plurality of replicated databases 140a-n and a management system 202 (optional), which are operatively coupled together via network 108. Management system 202 may be provided in one or more devices and may be adapted to help maintain or otherwise organize the replicated databases 140a-n. Management system 202 may be co-located with one or more replicated databases. Management system 202 may be distributed among devices. Management system 202 may be associated with all or part of the data operatively associated with the replicated databases. Management system 202 may be adapted to send and/or receive messages or the like over network 108 to/from each of the replicated databases and/or the hosting device. In certain implementations, for example, one or more channels may be provided to which the devices may selectively subscribe, and in doing so either read and/or write messages from/to the other devices via the channel.

In certain implementations, for example, management system 202 may include one of the replicated databases or storage units which may be adapted to serve as a master or coordinator with regard to the other replicated databases or storage units for at least a portion of the data. In other implementations, for example, management system 202 may be provided through one or more other processes and/or devices adapted to coordinate or otherwise control the replicated databases or storage units. In either of these examples, it may be important that only the coordinating process or device be allowed to determine or otherwise initiate a split operation, for example, to avoid initiating conflicting split operations.

By way of example but not limitation, management system 202 may be adapted to determine or otherwise initiate that at least a portion of the data operatively associated with the replicated databases should be reorganized in some manner. For example, management system 202 may determine that a portion of the data should be reorganized based, at least in part, on a size parameter 218 (e.g., based, at least in part, on an amount of data, and/or the like) and/or access performance parameter 220 (e.g., based, at least in part, on access requests, and/or the like). In such cases, for example, management system 202 may determine that a portion of the data should be reorganized in such a manner as to form a reorganized version of the portion of data. For example, a portion of the data may be split (e.g., partitioned or otherwise separated) into two or more portions within the reorganized version.

If management system 202 determines that a reorganization of a portion of the data is to occur, a prepare action 208 may be presented or otherwise made available to each of the replicated databases 140a-n. Prepare action 208 may, for example, be transmitted through network 108 using one or more messages. Prepare action 208 may include, for example, at least one reorganization parameter 210 to specify or otherwise identify at least one reorganization operation that is to be conducted. By way of example but not limitation, as part of a split operation, reorganization parameter 210 may include a split operation parameter that identifies at least one split point (e.g., logical point) within a portion of the data to be reorganized. In certain other implementations, for example, reorganization parameter 210 may include a list of records, one or more ranges of data, and/or the like which specify or otherwise may be used to determine how to reorganize at least one portion of data into one or more portions of data.

In response to prepare action 208, each replicated database 140a-n may determine if the reorganization may proceed. If a replicated database determines that the reorganization may not proceed then, for example, an abort action 216 may be presented or otherwise made available to the other replicated databases and/or management system 202. By way of example but not limitation, a replicated database may be determined to be "too busy" to support the reorganization process. Abort action 216 may, for example, be transmitted through network 108 using one or more messages.

If a replicated database determines that the reorganization may proceed then, for example, an agreement action 212 may be presented or otherwise made available to the other replicated databases and/or management system 202. Agreement action 212 may, for example, be transmitted through network 108 using one or more messages. If a replicated database determines that the reorganization may proceed then certain preparation processes, for example as described in greater detail in subsequent sections, may be initiated or otherwise conducted by the replicated database.

In response to an agreement action 212 from each of the replicated databases, management system 202 may, for example, produce a commit action 214. Commit action 214 may, for example, be transmitted through network 108 using one or more messages. In response to the commit action 214, each of the replicated databases 140a-n may proceed with the reorganization process, for example as described in greater detail in subsequent sections.

Reference is now made to FIG. 3A, which is a block diagram illustrating an exemplary embodiment of a replicated database 140 that is being prepared for a reorganization process. Replicated database 140 may include data that is organized in some manner such that identifiable portions of data exist. By way of example but not limitation, as illustrated here, data may be at least logically grouped or otherwise arranged in the form of tables 302a-n, wherein table 302a includes, for example, partitions 304a-n. Portion 304a may, for example, include a plurality of data records 305.

In FIGS. 3A-C, the exemplary reorganization process is directed towards splitting partition 304b into two partitions 304b1 and 304b2. In FIG. 3A, partition 304b is operatively associated with replicated database 140. In preparation for the reorganization process, for example in response to a prepare action 208, an update log 306 associated with partition 304*b* may be maintained and include collected data updates 204*a-n* associated with partition 304*b*. Data updates 204*a-n* may include locally initiated data updates (e.g., initiated by replicated database 140) and/or remotely initiated data updates (e.g., initiated by another replicated database).

In FIG. 3B, replicated database 140' illustrates a later stage in the reorganization process, for example, following a commit action 214, wherein partition 304*b* remains operatively associated with replicated database 140' and is copied and divided into partitions 304*b*1 and 304*b*2 based, at least in part, on the reorganization parameter 210. While illustratively shown within table 302*a* in FIG. 3B, the reorganized version that includes partitions 304*b*1 and 304*b*2 is not yet operatively associated with replicated database 140'. As illustrated, update log 306, may also be divided into update log 312*a* and 312*b*, wherein update log 312*a* includes data updates associated with partition 304*b*1 and update log 312*b* includes data updates associated with partition 304*b*2.

In FIG. 3C, replicated database 140" illustrates the results following completion of the reorganization process. Here, partitions 304*b*1 and 304*b*2 have replaced partition 304*b* within table 302*a* and are each operatively associated with replicated database 140". Partition 304*b* (no longer shown) has been operatively disassociated with replicated database 140". The data updates within update log 312*a* have been applied, as applicable, to the data within partition 304*b*1. The data updates within update log 312*b* have been applied, as applicable, to the data within partition 304*b*2. There may be occasions, for example, when a data update within update log 312*b* may not need to be applied to the data within partition 304*b*2 because the data update was already applied to the data when it was within partition 304*b*. For example, a plurality of data updates may be collected between the time the split of the partition 304*b* into the new partitions 304*b*1 and 304*b*2 begins and the time the new partitions are formed. Since updates to the data in partition 304*b* continue to happen during the formation of the new partitions 304*b*1 and 304*b*2, some of these updates may already have been applied to the data within partition 304*b* before that data is copied over into partitions 304*b*1 and 304*b*2.

To identify, track or otherwise determine which data updates may need to be applied and/or which data updates may have already been applied in the data within the reorganized version, each data update 204 may include an identifier 206 (e.g., a substantially unique identifier). For example, identifier 206 may include a sequential number, timestamp, and/or other like differentiating and/or order identifying information.

Reference is now made to FIG. 4, which further illustrates a split operation as conducted on partition 304*b* to create a reorganized version that includes partitions 304*b*1 and 304*b*2. Here, for example, as illustrated reorganization parameter 210 specifies a split point. In certain implementations, the split point may evenly divide partition 304*b*. In other implementations, the split point may not evenly divide partition 304*b*.

FIG. 5 further illustrates a split operation as conducted on partition 304*a* to create a reorganized version that includes partitions 304*a*1, 304*a*2 and 304*a*3. Here, for example, as illustrated reorganization parameter 210 may specify more than one split point.

Figure 6:
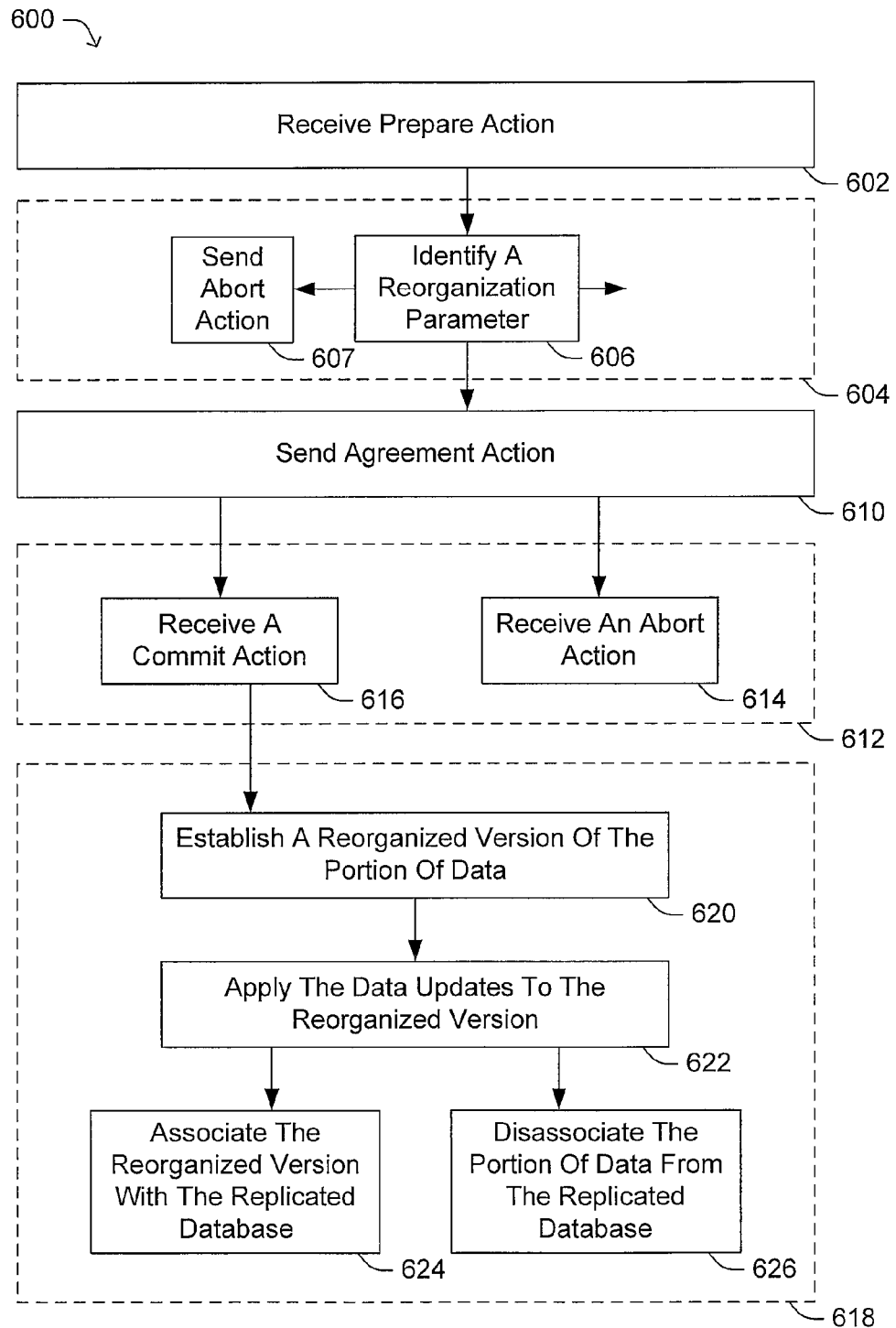
FIG. 6 is a flow diagram illustrating an exemplary method for dynamically reorganizing replicated databases.

Reference is now made to FIG. 6, which is a flow diagram illustrating an exemplary method 600 for reorganizing replicated databases. In 602, a prepare action may be received or otherwise identified, which may lead to a preparation stage 604. In certain implementations, 602 may include, for example, determining that a reorganization of data may be needed.

In 606, a reorganization parameter may be identified. In 607, if for some reason the replicated database may be unable to accept or otherwise support the reorganization process, an abort action may be sent or otherwise made available to the other replicated databases.

In 610, an agreement action may be sent or otherwise made available to the other replicated databases, which may lead to an interim stage 612. In 614, for example during the interim stage, an abort action may be received or otherwise made available and/or in 616 a commit action may be received or otherwise made available. During interim stage 612, the updates may continue to be processed. An abort action (sent or received) may act to cancel or otherwise postpone the reorganization process. In certain implementations, an abort action may result automatically based, at least in part, on a timed period or the like.

The commit action of 616 may lead to a reorganization stage 618, which may include, for example, in 620 establishing a reorganized version of the portion of the data. In 622, applicable data updates may be applied to the reorganized version. In 624 and 626 the reorganized version may replace the existing version of the portion of data within the replicated database. In 624, the reorganized version may be operatively associated with the replicated database, while in 626 the existing version may be operatively disassociated with the replicated database.

Several exemplary techniques are described in greater detail in subsequent sections which may be implemented, for example, to allow for a split operation in accordance with method 600 to proceed not only in a coordinated manner but also in a manner that allows for read and/or write operations to continue to be processed with little if any service interruption.

In the drawings described and provided herein, a variable "n" has been used to indicate a plurality of referenced items or features. For example, in FIG. 2 a plurality of replicated databases is referenced as 140*a* through 140*n*, and in FIG. 3A a plurality of tables is referenced as 302*a* through 302*n*. The multiple use of the variable "n" does not, however, necessarily mean that the actual number of each plurality of items or features must be the same. Thus, by way of example but not limitation, there may be twelve (i.e., n=12) replicated databases and one thousand (i.e., n=1000) tables.

In certain implementations, for example, additional coordination and control of a reorganization process may be exercised. By way of example but not limitation, assume that there are three devices (e.g., storage units) SU1, SU2 and SU3 in three regions that will be splitting a portion of data (e.g., a partition having a plurality of records). Let SU1 be the coordinating storage unit and let the source partition be T and let the split partitions be T' and T". Here, also by way of example, SU1, SU2 and SU3 may be configured to communicate through one or more channels to which they may subscribe and exchange messages.

As such, SU1 may initiate the split operation by writing a PREPARE message in a message broker channel associated with T. The PREPARE message may indicate the new split partitions T' and T" and their respective message broker channels.

In response to the PREPARE message, each of SU1, SU2 and SU3 may decide individually whether to split or not. Assuming that the storage unit decides to split partition T, then the storage unit subscribes to the respective message broker channels for T' and T" and writes a PREPARED message in the message broker channel for T, indicating the storage unit's decision to split the partition T. If a storage unit decides not to split (or it cannot subscribe to the channels for partitions T' and T"), it may write a REJECTED message in the channel for partition T.

Each storage unit, after writing the PREPARED message, may then wait for either an ABORT or COMMIT message.

SU1, after collecting all the responses from the storage units, may decide to continue with the split operation if all responses are PREPARED. If any response is REJECTED or if some storage unit does not respond within a set period of time, for example, then SU1 may decide to ABORT the split operation. If SU1 decides to continue with the split operation, SU1 may write a COMMIT message in the channel for partition T. If SU1 decides to ABORT the split operation, then SU1 may instead write an ABORT message in the channel for partition T.

If a storage unit receives an ABORT message in the channel for partition T (e.g., it may have written PREPARED message earlier, it may have written REJECTED message earlier, or it may not have written either message earlier), it simply unsubscribes from the channels for partitions T' and T". As such, no further action need be taken by the storage unit with regard to the partition split operation.

If on the other hand a storage unit receives a COMMIT message in the channel for partition T (e.g., it had written a PREPARED message earlier), it may then write an ENDOF-TOPIC message in the channel for partition T and start publishing update messages in the channels for partitions T' and T". Thus, for example, whenever a subsequent update happens on a record of partition T, the corresponding message may be written to the channel for partition T' or the channel for partition T", as applicable, but not to the channel for partition T. However, the update messages from the channels of T' and T" may not be applied by the storage unit yet, as the partitions T' and T" have not yet been created therein. The storage unit will then wait until an ENDOFTOPIC message is received from all storage units in the channel for partition T.

The copying of records and operative association/disassociation may be handled in a variety of ways. Several examples are provided below to illustrate some variations. As used herein the terms "copy", "copying" and "copies" may, for example, include actual copying and/or movement of data (e.g., records) within memory and/or modifying related information (e.g., ownership data, accounting data, metadata, and/ or the like) that in some manner logically associates such data with at least one partition or the like.

In certain implementations, copies may be temporarily "fuzzy" when not current with regard to the database's write operations such as update, insert and/or delete operations. In certain implementations, copies may be "sharp" when current or substantially current given the distributed/replicated arrangement of the database, with regard to the databases write operations such as update, insert and/or delete operations.

In accordance with an exemplary implementation, after a storage unit sees the ENDOFTOPIC messages from all the storage units, it may then create "fuzzy copies" of partitions T' and T" based on the records in partition T. The storage unit may then unsubscribe from the channel for partition T. Note that the storage unit may continue to perform read and write operations on partition T, and/or generate updates in the channels for partitions T' and T". After creating the fuzzy copies of T' and T", the storage unit may start to apply the updates from the messages in the channels for partitions T' and T". Once the stream of updates to be applied on T' and T" are finished or nearly finished, updates may be blocked momentarily on partition T; however, read operations may continue to access partition T. After the updates are blocked on partition T, markers may be placed in the channels for partitions T' and T", and the messages in these channels may be consumed until the markers are seen by the storage units. Then, a router map or the like may be updated to indicate the existence of the new partitions T' and T" and the disappearance of existing partition T. Consequently, partitions T' and T" may now be ready for updates. Thus, subsequent read operations may be handled with access to partitions T' and T", instead of existing partition T. The existing partition T may be deleted (e.g., with data actually being erased and/or data being logically disassociated in some manner) from the storage unit. In this example, while a split operation is in progress existing partition T may remain available for read operations. Write operations may also be executed on existing partition T, for example, until the later stages of the split operation when the new partition channels are mostly consumed and the new partitions are almost ready. Note also that the read operations, which in most instances may be the dominant type, suffer no unavailability and writes suffer very little unavailability, on the whole, in the example presented above.

In other implementations, given some tolerance in the synchronization across the replicated database, after a storage unit sees the ENDOFTOPIC messages from all the storage units, it may then create "fuzzy copies" of partitions T' and T" based on the records in partition T and rather than delay certain access operations the storage unit may immediately shift access to the new partitions T' and T" which may remain temporarily fuzzy until all of the applicable update, insert and/or delete operations have been applied.

In certain other exemplary implementations, after a storage unit sees the ENDOFTOPIC messages from all storage units, rather than fuzzy copies, "sharp copies" may be provided wherein the storage unit may pause and/or lock all insert and delete operations on existing partition T and collect a list of records in T to be copied to T' and T". Reads and updates of the records in existing partition T may continue to be allowed at this time. Once the list of records to be copied is identified, the records may be copied to new partitions T' and T", for example, one record at a time. Thus, each of the records may only be in one of the new partitions (T' and T") or the existing partition (T). During this copying stage, reads, updates and deletes may be first tried using either T' or T" depending on which new partition the record maps to and if the copy has not been completed then the existing partition T may be used. For insert operations, either T' or T" depending on which partition the record maps to may be used. Such insert, delete and/or update operations may generate change messages that are collected in the channels/logs set up for the new partitions T' and T". Once the copying of all of the records from T to T' and T" is completed, the new partitions T' and T" are ready and, for example, a router map may be updated to indicate the existence (operative association) of the new partitions T' and T" and the disappearance (operative disassociation) of partition T. Thereafter, partitions T' and T" may be used for all read and write operations and existing partition T may be deleted from the storage unit.

In still other exemplary implementations, after a storage unit sees the ENDOFTOPIC messages from all storage units, "sharp copies" may be provided wherein the storage unit may pause/lock all insert, delete and update operations on existing partition T and then copy records over from T into T' and T", as applicable. Note that the existing partition T may continue to service read operations during the copy time. Once the records are copied over from T into T' and T", the new partitions T' and T" are ready and the existing partition T may be deleted. For example, the router map may be updated to indicate the existence (operative association) of the new partitions T' and T" and the disappearance (operative disassociation) of existing partition T. Thereafter, new partitions T' and T" are ready for all operations and existing partition T may be deleted from the storage unit.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A computer-implemented method comprising:
   determining that at least one existing partition within a database provided through a plurality of replicated databases is to be split into at least two new partitions;
   providing at least one message to said plurality of replicated databases indicating that said existing partition is to be split into said at least two new partitions;
   performing a split operation that is to be applied across said plurality of replicated databases with regard to said existing partition, wherein said existing partition comprises a plurality of data records and said at least two new partitions each comprise at least a portion of said plurality of data records; and
   during said split operation, allowing at least one type of access to said plurality of data records.

2. The method as recited in claim 1, wherein determining that said existing partition is to be split into at least two new partitions comprises determining that said existing partition is to be split into at least two new partitions using at least one of said plurality of replicated databases.

3. The method as recited in claim 1, wherein at least one of said at least one type of access comprises at least one of: a read operation, an update operation, an insert operation, or a delete operation.

4. The method as recited in claim 1, wherein said at least on message comprises at least a PREPARE message.

5. The method as recited in claim 4, wherein performing said split operation comprises, in response to said PREPARE message, having each of said plurality of databases that agrees to said split operation respond with a PREPARED message.

6. The method as recited in claim 5, wherein performing said split operation comprises, in response to said PREPARED messages from each of said plurality of replicated databases, providing a COMMIT message to said plurality of replicated databases.

7. The method as recited in claim 6, wherein performing said split operation comprises, in response to said COMMIT message, each of said plurality of replicated databases completes said split operation by operatively associating said at least two new partitions with said database and operatively disassociating said existing partition with said database.

8. The method as recited in claim 7, wherein performing said split operation comprises, in response to said COMMIT message, each of said plurality of replicated databases providing an ENDOFTOPIC message to each of said plurality of replicated databases, said ENDOFTOPIC message being associated with said existing partition.

9. The method as recited in claim 8, wherein performing said split operation comprises, in response to said ENDOFTOPIC message from each of said plurality of replicated databases, for each of said replicated databases creating at least a fuzzy copy of each of said at least two new partitions.

10. The method as recited in claim 9, wherein performing said split operation comprises, in response to said COMMIT message, at least one of said plurality of replicated databases providing at least one update message to said plurality of replicated databases, said at least one update message being associated with at least one data record in one of said at least two new partitions.

11. The method as recited in claim 10 wherein, performing said split operation comprises, for each of said plurality of replicated databases, storing said at least one update message and applying said stored update message to said at least one data record in one of said at least two new partitions to change at least one said fuzzy copy into a sharp copy.

12. The method as recited in claim 8, wherein performing said split operation comprises, in response to said ENDOFTOPIC message from each of said plurality of replicated databases, for each of said replicated databases creating a sharp copy of each of said at least two new partitions.

13. The method as recited in claim 4, wherein performing said split operation comprises, in response to said PREPARE message, for each of said plurality of databases that is unable to support said split operation providing a REJECTED message to said plurality of databases.

14. The method as recited in claim 13, wherein performing said split operation comprises, in response to at least one said REJECTED message, providing an ABORT message to said plurality of replicated databases.

15. A system comprising:
    at least one processor;
    a management system; and
    a plurality of replicated databases, said plurality of replicated databases being operatively coupled together and to said management system, and wherein said management system initiates a split operation that is to be applied across said plurality of replicated databases with regard to at least one existing partition comprising a plurality of data records by providing at least one message to said plurality of replicated databases indicating that said existing partition is to be split into at least two new partitions, said split operation to split said at least one existing partition into said at least two new partitions each comprising at least a portion of said plurality of data records, and wherein during said split operation at least one type of access is provided to said plurality of data records.

16. The system as recited in claim 15, wherein at least one of said plurality of replicated databases comprises said management system at least with regard to said at least one existing partition.

17. The system as recited in claim 15, wherein said at least on message comprises at least a PREPARE message.

18. The system as recited in claim 17, wherein, in response to said PREPARE message, each of said plurality of databases that agrees to said split operation provides a PREPARED message to at least said management system, wherein, in response to said PREPARED messages from each of said plurality of replicated databases, said management system provides a COMMIT message to said plurality of replicated databases, and wherein, in response to said COMMIT message each of said plurality of replicated databases completes said split operation by operatively associating said at least two new partitions with said replicated database and operatively disassociating said existing partition with said replicated database.

19. The system as recited in claim 18, wherein, in response to said COMMIT message each of said plurality of replicated databases provides an ENDOFTOPIC message to each of said plurality of replicated databases, said ENDOFTOPIC message being associated with said existing partition, wherein, in response to said COMMIT message at least one of said plurality of replicated databases provides at least one update message to said plurality of replicated databases, said at least one update message being associated with at least one data record in one of said at least two new partitions, and, wherein, each of said plurality of replicated databases store said at least one update message applies said stored update message to said at least one data record in one of said at least two new partitions in response to said ENDOFTOPIC message from each of said plurality of replicated databases.

20. The system as recited in claim 19, wherein, in response to said ENDOFTOPIC message from each of said plurality of replicated databases, each of said replicated databases creates at least a fuzzy copy or at least one sharp copy of each of said at least two new partitions while continuing to provide said at least one type of access to said existing partition.

21. The system as recited in claim 17, wherein, in response to said PREPARE message, each of said plurality of databases that is unable to support said split operation provides a REJECTED message to said plurality of databases, and wherein, in response to at least one said REJECTED message, said management system an ABORT message to said plurality of replicated databases and said split operation is cancelled.

22. An article comprising:
a non-transitory computer-readable medium comprising having stored therein computer-implementable instructions executable by one or more processing units to:
determine that at least one existing partition within a database provided through a plurality of replicated databases is to be split into at least two new partitions;
initiate transmission of at least one message to said plurality of replicated databases indicating that said existing partition is to be split into said at least two new partitions;
perform a split operation that is to being applied across a plurality of replicated databases with regard to an existing partition therein, wherein said existing partition comprises a plurality of data records and said at least two new partitions each comprise at least a portion of said plurality of data records; and
allow at least one type of access to said plurality of data records during said split operation.

\* \* \* \* \*